United States Patent
Holland et al.

(10) Patent No.: US 10,013,046 B2
(45) Date of Patent: Jul. 3, 2018

(54) POWER MANAGEMENT TECHNIQUES

(71) Applicant: Apple Inc., Cupertino, CA (US)

(72) Inventors: Peter F. Holland, Los Gatos, CA (US);
Hao Chen, San Ramon, CA (US);
Sukalpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 15/150,109

(22) Filed: May 9, 2016

(65) Prior Publication Data
US 2017/0322614 A1    Nov. 9, 2017

(51) Int. Cl.
*G06F 3/038* (2013.01)
*G06F 1/32* (2006.01)
*G09G 5/00* (2006.01)

(52) U.S. Cl.
CPC .......... *G06F 1/3265* (2013.01); *G06F 1/3218* (2013.01); *G06F 1/3225* (2013.01); *G09G 5/006* (2013.01); *G09G 2330/021* (2013.01); *G09G 2330/026* (2013.01); *G09G 2340/06* (2013.01); *G09G 2360/121* (2013.01)

(58) Field of Classification Search
CPC .... G06F 1/3287; G06F 1/3228; G06F 1/3206; G06F 1/3203; G06F 1/3234; G06F 1/3237; G06F 1/3246
See application file for complete search history.

(56) References Cited

U.S. PATENT DOCUMENTS

| | | |
|---|---|---|
| 2014/0189409 A1 * | 7/2014 | Jeyaseelan ............ G06F 1/3253 713/324 |
| 2014/0344599 A1 | 11/2014 | Branover et al. |
| 2015/0095688 A1 | 4/2015 | Sugumar et al. |
| 2015/0121106 A1 | 4/2015 | Eckert et al. |
| 2015/0362987 A1 | 12/2015 | Shin et al. |

* cited by examiner

*Primary Examiner* — Hau H Nguyen
(74) *Attorney, Agent, or Firm* — Rory D. Rankin; Meyertons, Hood, Kivlin, Kowert & Goetzel, P.C.

(57) ABSTRACT

Systems, apparatuses, and methods for improved power management techniques. An apparatus may include a display control unit, a communication fabric, a memory controller, a memory cache, and a memory. When the memory is power-gated, and the display control unit needs to fetch pixel data, the display control unit may send a wake-up signal to the memory before sending a wake-up signal to the communication fabric. The display control unit may then issue the pixel fetch request later. Additionally, if the display control unit determines that the pixel data has a high probability of being cached, then the display control unit may not send a wake-up signal to the memory, and the display control unit may issue the request earlier. More generally, the display control unit may send wake-up signals to multiple components in a manner which accounts for the wake-up latency of each component.

18 Claims, 10 Drawing Sheets

POWER MANAGEMENT TECHNIQUES

BACKGROUND

Technical Field

Embodiments described herein relate to the field of computer systems and more particularly, to optimizing memory and communication fabric power management techniques.

Description of the Related Art

Increasingly, electronic devices use power management techniques in order to reduce power consumption. In some cases the devices may rely on power supplied by a battery and power management techniques may prolong the operating time of the device before recharging of the battery is required. It is often the case that there is a tradeoff between power consumption and performance as a reduction in power consumption often results in a reduction in performance. Consequently, improved methods for determining when and how to utilize power management are desirable.

Often during the operation of a device, one or more components may be power-gated at a given point in time. However, the operating conditions may change, and these power-gated components may need to be turned back on to perform one or more functions. When power-gated components are turned back on, the manner in which they are turned back on may not be performed in an optimal fashion. Also, the device may turn a power-gated component back on when the component is not really needed for performing an impending operation. This ends up wasting power unnecessarily.

SUMMARY

Systems, apparatuses, and methods for implementing improved power management techniques are contemplated.

In one embodiment, an apparatus may include at least a display control unit, a communications fabric, a memory controller, a memory cache, and a memory. The display control unit may process source pixel data to generate output pixels to be driven to a display. In order to process source pixel data, the display control unit may generate pixel fetch requests. The display control unit may issue pixel fetch requests to the memory, and the pixel fetch requests may traverse multiple components on the path to the memory. In some cases, one or more components of the apparatus may be power-gated or in a reduced power state in order to reduce power consumption. Instead of waking up a plurality of components in a sequential manner, the components may be woken up in an overlapping manner which will minimize the latency of processing the fetch request while also maximizing power savings.

While multiple components are in a reduced power state, the display control unit may determine which components will need to be woken up to process a pixel fetch request. The display control unit may wake up the longest latency components first followed by the components that need a shorter amount of time to return to an operational state. In one embodiment, the display control unit may utilize the cache hint to determine which components need to be woken up. If the cache hint is set to "do not allocate", then the display control unit may send a sideband wake-up signal to the memory using a first threshold, wherein the first threshold is a relatively high (i.e., relatively early) threshold. The display control unit may then issue a pixel fetch request using a second threshold, wherein the second threshold is a relatively low (i.e., relatively late) threshold. The pixel fetch request may cause the communication fabric to wake up when the communication fabric receives the pixel fetch request. The first and second thresholds may correspond to buffer occupancy levels for one or more buffers of the display control unit. The one or more buffers may include a pixel buffer and/or one or more line buffers.

If the cache hint is set to "allocate", then the display control unit may prevent a sideband wake-up signal from being sent to the memory. Rather, when the cache hint is set to "allocate", the display control unit may be configured to issue a pixel fetch request using a third threshold, wherein the third threshold is less than the second threshold. The pixel fetch request may cause components to wake-up in a serial manner as the pixel fetch request traverses the path to the memory cache. This ripple wake-up effect may be more efficient if the requested data is cached in the memory cache as compared to cases when the requested data is stored in memory. In other embodiments, the display control unit may utilize other configuration data (e.g., directed indication, use-based data, target address) besides the cache hint when determining which components to wake up, the timing of the wake-up signals, and the timing of issuing requests.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
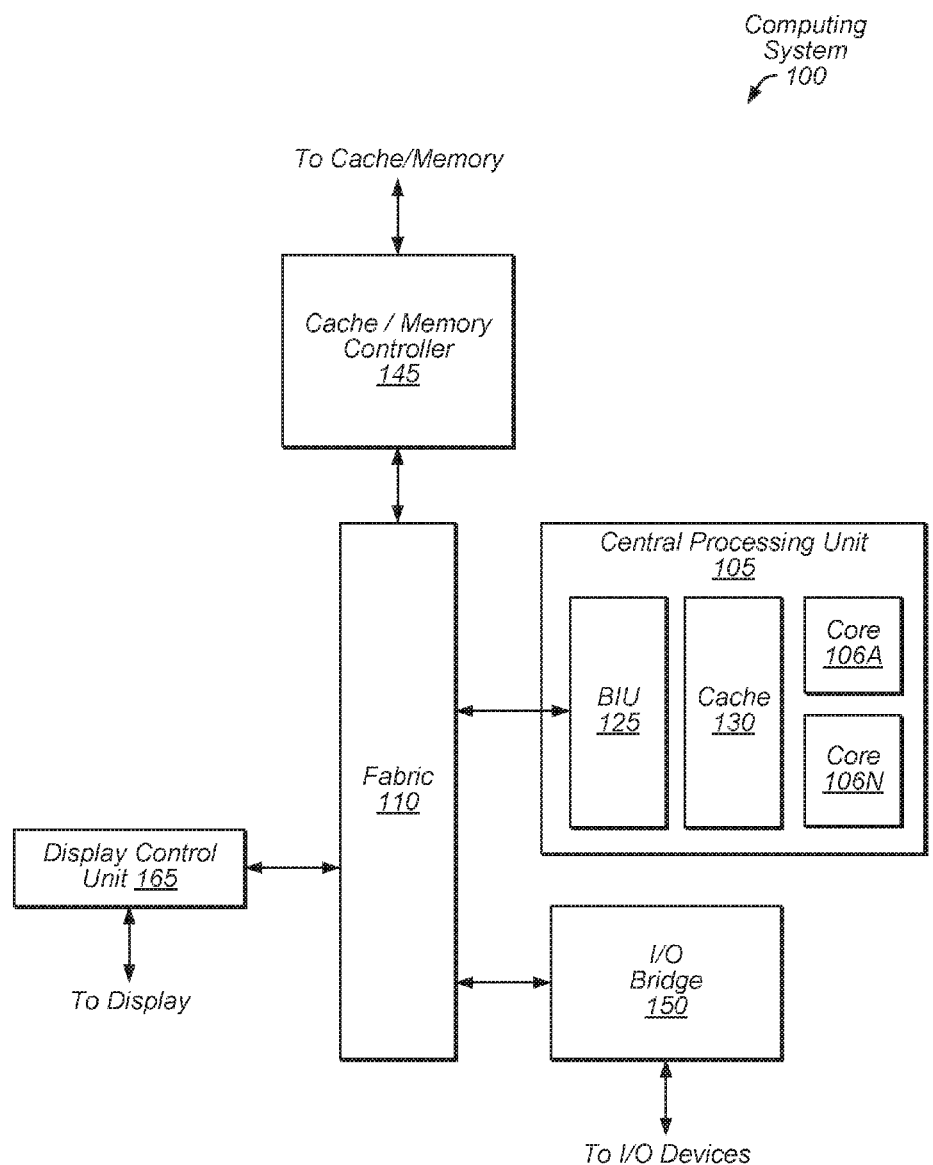
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display control unit . . . ." Such a claim does not foreclose the system from including additional components (e.g., a processor, a memory controller, a display).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a computing system 100. In some embodiments, some or all elements of the computing system 100 may be included within a system on a chip (SoC). In some embodiments, computing system 100 may be included in a mobile device. In the illustrated embodiment, the computing system 100 includes fabric 110, central processing unit (CPU) 105, input/output (I/O) bridge 150, cache/memory controller 145, and display control unit 165. Although the computing system 100 illustrates central processing unit 105 as being connected to fabric 110 as a sole central processing unit of the computing system 100, in other embodiments, central processing unit 105 may be connected to or included in other components of the computing system 100 and other central processing units may be present. Additionally or alternatively, the computing system 100 may include multiple central processing units 105. The multiple central processing units 105 may include different units or equivalent units, depending on the embodiment.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

In the illustrated embodiment, central processing unit 105 includes bus interface unit (BIU) 125, cache 130, and cores 106A and 106N. In various embodiments, central processing unit 105 may include various numbers of cores and/or caches. For example, central processing unit 105 may include 1, 2, or 4 processor cores, or any other suitable number. In some embodiments, cores 106A and/or 106N include internal instruction and/or data caches. In some embodiments, a coherency unit (not shown) in fabric 110, cache 130, or elsewhere in computing system 100 may be configured to maintain coherency between various caches of computing system 100. BIU 125 may be configured to manage communication between central processing unit 105 and other elements of computing system 100. Processor cores such as cores 106A and 106N may be configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display control unit 165 may be configured to read data from a frame buffer and provide a stream of pixel values for display. Display control unit 165 may be configured as a display pipeline in some embodiments. Furthermore, display control unit 165 may include one or more interfaces (e.g., MIPI® or embedded display port (eDP)) for coupling to a user display (e.g., a touchscreen or an external display). I/O bridge 150 may include various elements such as universal serial bus (USB) communications, security, audio, and/or low-power always-on functionality, for example. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that the number of components of system 100 (and the number of subcomponents for those shown in FIG. 1, such as within the central processing unit 105) may vary from embodiment to embodiment. There may be more or fewer of each component/subcomponent than the number shown in FIG. 1. It is also noted that system 100 may include many other components not shown in FIG. 1. In various embodiments, system 100 may also be referred to as a system on chip (SoC), an integrated circuit (IC), an application specific integrated circuit (ASIC), or an apparatus.

Figure 2:
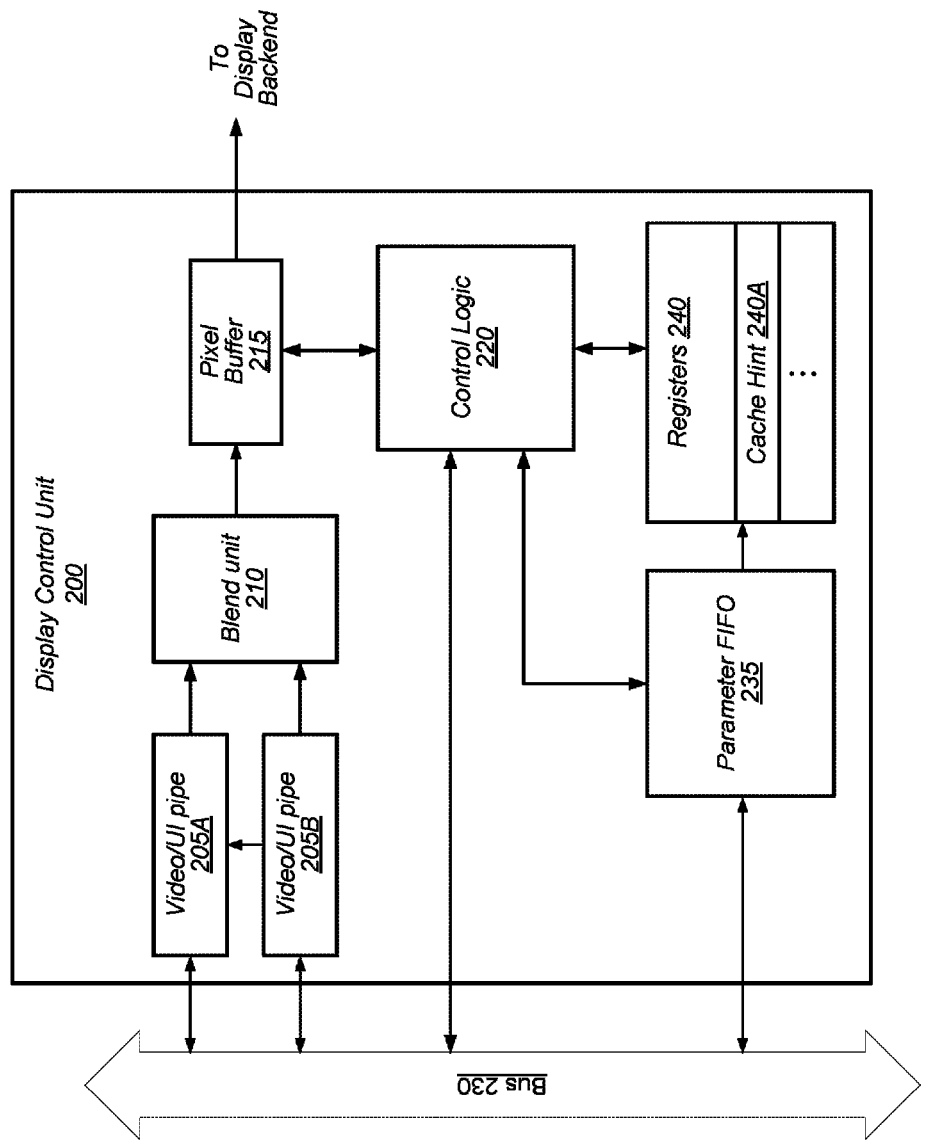
FIG. 2 is a block diagram of one embodiment of a display control unit.

Turning now to FIG. 2, one embodiment of a display control unit 200 is shown. Display control unit 200 may represent display control unit 165 included in computing system 100 of FIG. 1. Display control unit 200 may be coupled to bus 230 and to a display backend (not shown). In some embodiments, a display backend may directly interface to the display to display pixels generated by display control unit 200. Display control unit 200 may include functional sub-blocks such as one or more video/user interface (UI) pipelines 205A-205B, blend unit 210, pixel buffer 215, control logic 220, parameter FIFO 235, and registers 240. Display control unit 200 may also include other components which are not shown in FIG. 2 to avoid cluttering the figure.

Bus 230 may couple various functional blocks such that the functional blocks may pass data between one another. Bus 230 may correspond to fabric 110 of FIG. 1. Display control unit 200 may be coupled to bus 230 in order to receive video frame data for processing. The display control unit 200 may include one or more video/UI pipelines 205A-B, each of which may be a video and/or UI pipeline depending on the embodiment. It is noted that the terms "video/UI pipeline", "pixel processing pipeline", and "pixel generation logic" may be used interchangeably herein. In other embodiments, display control unit 200 may have one or more dedicated video pipelines and/or one or more dedicated UI pipelines. Each video/UI pipeline 205 may fetch a video or image frame (or a portion of a frame) from a buffer coupled to bus 230. The buffered video or image frame may reside in a system memory. Each video/UI pipeline 205 may fetch a distinct image and may process the image in various ways, including, but not limited to, format conversion (e.g., YCbCr to ARGB), image scaling, and dithering. In some embodiments, each video/UI pipeline 205 may process one pixel at a time, in a specific order from the video frame, outputting a stream of pixel data, and maintaining the same order as pixel data passes through.

Blend unit 210 may receive a pixel stream from one or more video/UI pipelines 205. If only one pixel stream is received, blend unit 210 may simply pass the stream through to the next sub-block. However, if more than one pixel stream is received, blend unit 210 may blend the pixel colors together to create an image to be displayed. In various embodiments, blend unit 210 may be used to transition from one image to another or to display a notification window on top of an active application window. For example, a top layer video frame for a notification, such as, for a calendar reminder, may need to appear on top of an internet browser window. The calendar reminder may comprise some transparent or semi-transparent elements in which the browser window may be at least partially visible, which may require blend unit 210 to adjust the appearance of the browser window based on the color and transparency of the calendar reminder.

The output of blend unit 210 may be a single pixel stream composite of the one or more input pixel streams. The pixel stream output of blend unit 210 may be sent to pixel buffer 215. In other embodiments, the pixel stream may be sent to other target destinations. For example, the pixel stream may be sent to a network interface. It is noted that while a pixel buffer 215 is described herein, other structures configured to store data are possible and are contemplated.

Pixel buffer 215 may be configured to store pixels output from blend unit 210. In various embodiments, buffer 215 may operate as a queue or first-in-first-out (FIFO) structure in which data stored in the buffer is read out in the same order it was written. Such a buffer may comprise RAM or registers and may utilize pointers to the first and last entries in the FIFO. During "normal" operation, pixel buffer 215 may be the interface to the display backend (not shown), which may control the display in order to display the pixels generated by display control unit 200. In one embodiment, the display backend may read pixels at a rate from pixel buffer 215 according to a pixel clock. The rate may depend on the resolution of the display as well as the refresh rate of the display. For example, a display having a resolution of N×M and a refresh rate of R frames per second may have a pixel clock frequency based on N×M×R. On the other hand, pixel buffer 215 may be written by blend unit 210 as pixels are generated by blend unit 210. In some instances, the rate at which display control unit 200 generates pixels may be faster than the rate at which the pixels are read, assuming that data is provided to display control unit 200 from the memory (not shown) quickly enough. The pixels in pixel buffer 215 may thus be a measure of a margin of safety for display control unit 200 before erroneous operation is observed on the display.

In other cases, the pixel buffer 215 may not be able to provide data fast enough for proper display and an underrun condition may occur. Generally speaking, given a current processing rate of data stored in the pixel buffer 215, and knowledge of a typical data access latency, it can be determined whether the amount of data stored in the pixel buffer 215 will be adequate to prevent an underrun condition—assuming continued processing of pixel data at a given rate and continued requests for data with a given access latency. For example, a minimum amount of data can be determined to be needed to continue to satisfy processing demands. If the amount of data were to fall any lower, then it may not be possible to meet the current processing demands.

Control logic 220 may receive various control signals and include control logic for managing the overall operation of display control unit 200. For example, control logic 220 may receive a signal to indicate a new video frame is ready for processing. In some embodiments, this signal may be generated outside of display control unit 200 and in other embodiments display control unit 200 may generate the signal. In some embodiments, display control unit 200 may include a parameter buffer (e.g., parameter FIFO 235). The parameter FIFO 235 may store values to be written to the configuration registers 240 for subsequent frames. The same configuration of registers may be used for multiple frame generations, in some embodiments, and thus the parameter FIFO 235 may include data that indicates how many frames should be processed with a given configuration before a new configuration is used. The parameter FIFO 235 may further store register addresses of the configuration registers 240 and data to be written to those registers 240. The parameter FIFO 235 may thus be a mechanism to store a stream of frame processing in display control unit 200 and then permit display control unit 200 to perform the stream. Various other parameters that display control unit 200 uses to control how the various sub-blocks manipulate the video frame may also be stored in registers 240. In one embodiment, registers 240 may include cache hint 240A which may indicate if the source pixel data is likely to be cached in the memory cache (not shown). For example, the cache hint 240A may be set to "allocate" or "do not allocate", where "allocate" indicates corresponding data is or may be cached, and "do not allocate" indicates the data is not or is unlikely to be cached. Registers 240 may also include data setting input and output frame sizes, setting input and output pixel formats, location of the source frames, and destination of the output.

Parameter FIFO 235 may be configured to update control registers 240 before each source video frame is fetched. In some embodiments, parameter FIFO 235 may update all control registers 240 for each frame. In other embodiments, parameter FIFO 235 may be configured to update subsets of control registers 240 including all or none for each frame. A FIFO as used and described herein, may refer to a memory storage buffer in which data stored in the buffer is read in the same order it was written. A FIFO may be comprised of RAM or registers and may utilize pointers to the first and last entries in the FIFO.

During operation, control logic 220 may be configured to monitor the state of pixel buffer 215. It is noted that control logic 220 may also be referred to as a control unit. As described above, display control unit 200 (e.g., via pipes 205) may be configured to generate requests for data. Responsive to these requests, data is returned, processed, and used to populate pixel buffer 215. As noted, if the amount of data stored in pixel buffer 215 is inadequate to service current display needs, an underrun may occur which may cause undesirable visual artifacts or delays. One possible cause (or contributing factor) of an underrun condition may be an increased latency in servicing requests for data. For example, if display control unit 200 requests data and the return of requested data is delayed, then the amount of data in buffer 215 may not be adequate to service current processing needs. In other words, the processing rate of the data may be such that the available data is consumed and an underrun condition occurs. Consequently, ensuring the pixel buffer 215 has enough data is desired.

In various embodiments, control logic 220 may be configured to determine if the amount of data stored in pixel buffer 215 falls below one or more thresholds. The thresholds may indicate when the control logic 220 should generate wake-up signals to one or more other components and when the display control unit 200 should start issuing requests. In some cases, the thresholds may vary depending on configuration data stored in registers 240. For example, in one embodiment, if the cache hint indicates "do not allocate" for the source pixel data, then display control unit 200 may begin issuing requests at a first threshold. If the cache hint indicates "allocate", then display control unit 200 may begin issuing requests at a second threshold, wherein the second threshold is less than (i.e., later than) the first threshold. Accordingly, display control unit 200 may start issuing requests earlier in the case when the cache hint is set to "do not allocate" as compared to the case when the cache hint is set to "allocate". In addition, display control unit 200 may utilize different thresholds for generating wake-up signals based on whether the cache hint indicates "do not allocate" or "allocate". In other embodiments, display control unit 200 may utilize other configuration data (e.g., directed indication, use-based data, address) to determine which thresholds to utilize for waking up components and for issuing requests. In one embodiment, a wake-up signal may be a request (e.g., a request for data), with the request serving as the wake-up signal for one or more components. In other embodiments, a wake-up signal make take the form of a side-band signal. These and other embodiments are possible and are contemplated.

It is noted that the display control unit 200 illustrated in FIG. 2 is merely an example. In other embodiments, different functional blocks and different configurations of functional blocks may be possible depending on the specific application for which the display control unit is intended. For example, more than two video/UI pipelines may be included within a display control unit in other embodiments. Additionally, two or more units shown separately within display control unit 200 may be combined within a single functional sub-block in another embodiment.

Figure 3:
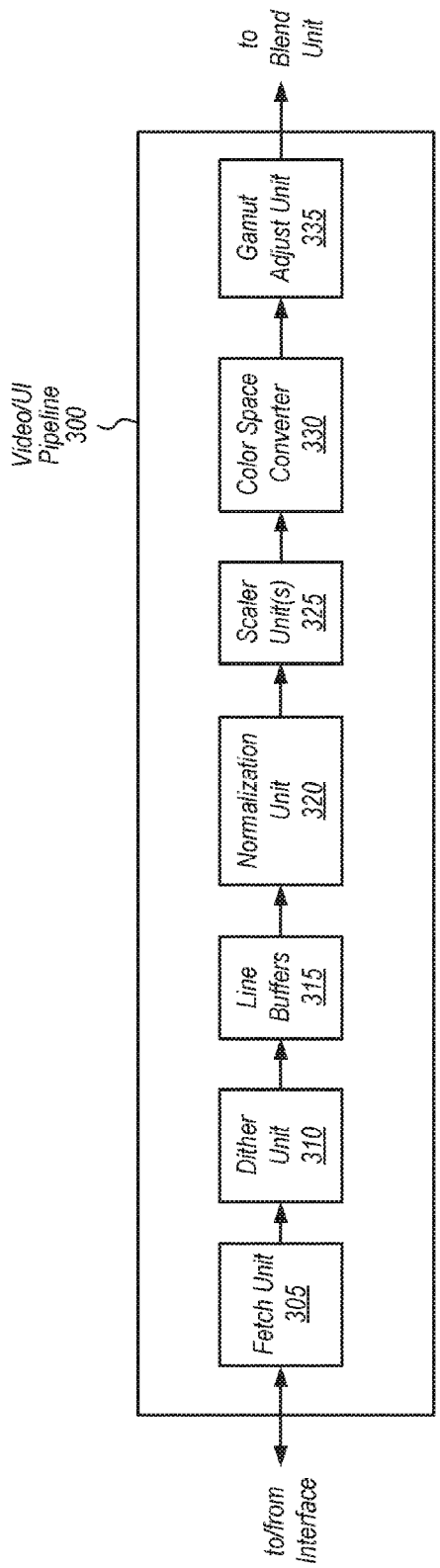
FIG. 3 is a block diagram illustrating one embodiment of a video/UI pipeline.

Referring now to FIG. 3, a block diagram of one embodiment of video/UI pipeline 300 is shown. Video/UI pipeline 300 may correspond to video/UI pipelines 201A and 201B of display control unit 200 as illustrated in FIG. 2. In the illustrated embodiment, video/UI pipeline 300 includes fetch unit 305, dither unit 310, line buffers 315, normalization unit 320, scaler unit(s) 325, color space converter 330, and gamut adjust unit 335. Video/UI pipeline 300 may be responsible for fetching pixel data for source frames stored in a memory, and then processing the fetched data before sending the processed data to a blend unit, such as, blend unit 210 of display control unit 200 as illustrated in FIG. 2.

Fetch unit 305 may be configured to generate read requests for source pixel data being processed by video/UI pipeline 300. Each read request may include one or more addresses indicating where the portion of data is stored in memory. In some embodiments, address information included in the read requests may be directed towards a virtual (also referred to herein as "logical") address space, wherein addresses do not directly point to physical locations within a memory device. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display pipeline, while in other embodiments, the memory management unit may be located elsewhere within a computing system.

In various embodiments, the amount of data stored in line buffers 315 may be monitored. Fetch unit 305 may determine if the amount of data stored in line buffers 315 falls below one or more thresholds. The thresholds may indicate when the fetch unit 305 should start issuing requests. In some cases, the thresholds may vary depending on configuration data. For example, in one embodiment, if a cache hint indicates "do not allocate" for the source pixel data, then fetch unit 305 may begin issuing requests at a first threshold. If the cache hint indicates "allocate", then fetch unit 305 may begin issuing requests at a second threshold, wherein the second threshold is less than the first threshold. Accordingly, fetch unit 305 may start issuing requests earlier in the case when the cache hint is set to "do not allocate" as compared to the case when the cache hint is set to "allocate". In other embodiments, fetch unit 305 may utilize other configuration data (e.g., directed indication, use-based data, address) to determine which thresholds for issuing requests.

Under certain circumstances, the total number of colors that a given system is able to generate or manage within the given color space—in which graphics processing takes place—may be limited. In such cases, a technique called dithering is used to create the illusion of color depth in the images that have a limited color palette. In a dithered image, colors that are not available are approximated by a diffusion of colored pixels from within the available colors. Dithering in image and video processing is also used to prevent large-scale patterns, including stepwise rendering of smooth gradations in brightness or hue in the image/video frames, by intentionally applying a form of noise to randomize quantization error. Dither unit 310 may, in various embodiments, provide structured noise dithering on the Luma channel of YCbCr formatted data. Other channels, such as the chroma channels of YCbCr, and other formats, such as ARGB may not be dithered.

Line buffers 315 may be configured to store the incoming frame data corresponding to row lines of a respective display screen. The frame data may be indicative of luminance and chrominance of individual pixels included within the row lines. Line buffers 315 may be designed in accordance with one of various design styles. For example, line buffers 315 may be SRAM, DRAM, or any other suitable memory type. In some embodiments, line buffers 315 may include a single input/output port, while, in other embodiments, line buffers 315 may have multiple data input/output ports.

Normalization unit 320 may perform an adjustment on the source pixel data. In various embodiments, normalization unit 320 may be configured to normalize the input pixel values to the range of 0.0 to 1.0. Some source images may be represented in a color space which has a range exceeding 0.0 to 1.0, or some source images may be represented in a color space with a range which uses only a portion of the values from 0.0 to 1.0. In one embodiment, normalization unit 320 may be configured to apply an offset to each input pixel value and then scale the resultant value to perform the normalization. In other embodiments, other techniques for normalizing the input pixel values may be utilized. If the input pixel values are already normalized, then normalization unit 320 may be a passthrough unit, or the input pixel values may bypass normalization unit 320.

Next, scaler unit(s) 325 may be configured to perform scaling on the source pixel data. In some embodiments, scaling of source pixels may be performed in two steps. The first step may perform a vertical scaling, and the second step may perform a horizontal scaling. Scaler unit(s) 325 may be designed according to any of varying design styles. In some embodiments, the vertical scaler and horizontal scaler of scaler unit(s) 325 may be implemented as multi-phase filters. These multi-phase filters may, in various embodiments, multiply each pixel retrieved by fetch unit 305 by a weighting factor. The resultant pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

After scaling has been performed by scaler unit(s) 325, color management within video/UI pipeline 300 may be performed by color space converter 330 and gamut adjust unit 335. In some embodiments, color space converter 330 may be configured to convert YCbCr source data to the RGB format. Alternatively, color space converter 330 may be configured to remove offsets from source data in the RGB format. Color space converter 330 may, in various embodiments, include a variety of functional blocks, such as an input offset unit, a matrix multiplier, and an output offset unit (all not shown). The use of such blocks may allow for the conversion from YCbCr format to RGB format and vice-versa.

In various embodiments, gamut adjust unit 335 may be configured to convert pixels from a non-linear color space to a linear color space, and vice-versa. In some embodiments, gamut adjust unit 335 may include a LUT and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. It is noted that the embodiment illustrated in FIG. 3 is merely an example. In other embodiments, different functional blocks and different configurations of functional blocks may be utilized.

Figure 4:
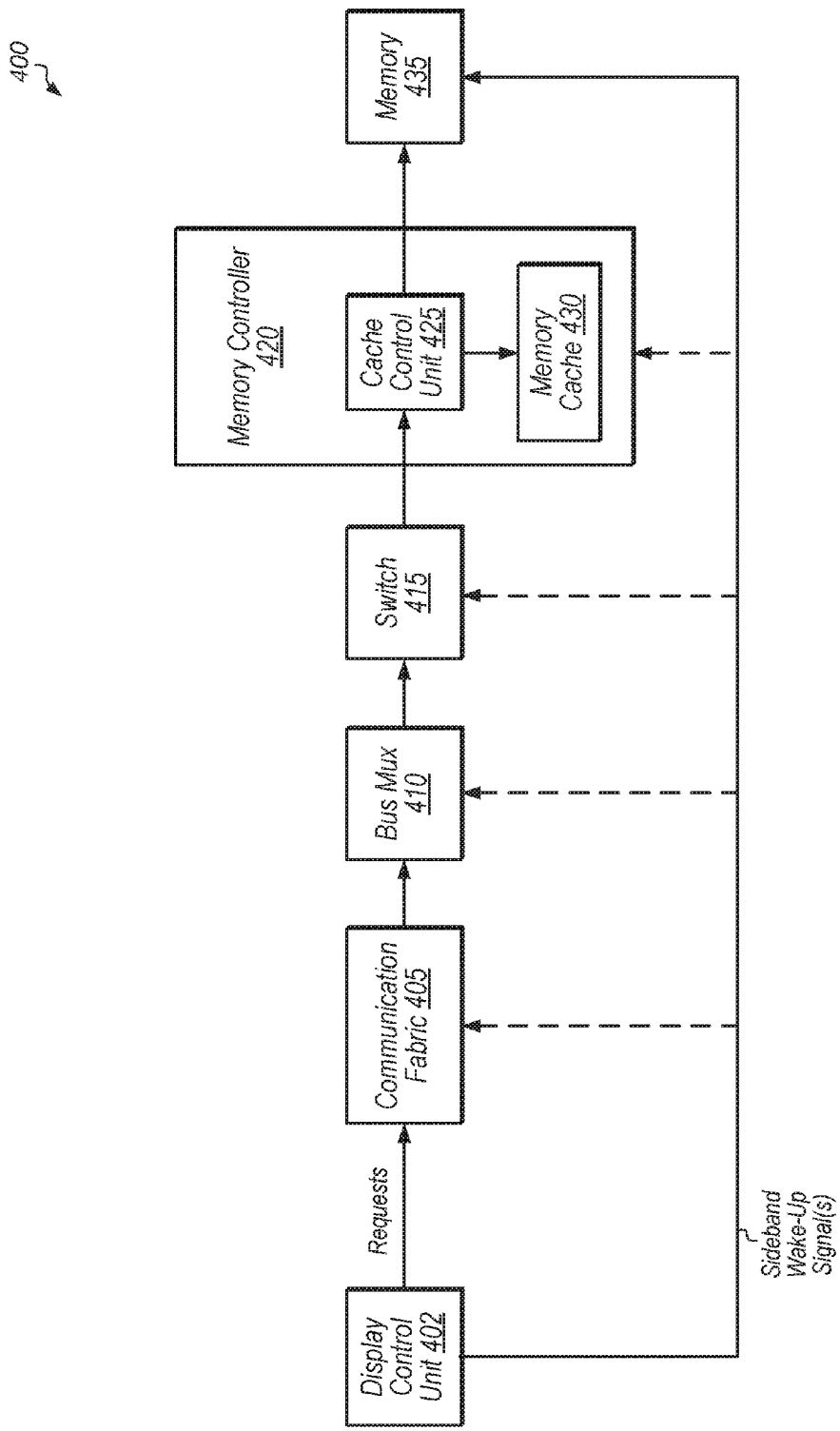
FIG. 4 is a block diagram illustrating one embodiment of system.

Turning now to FIG. 4, a block diagram of one embodiment of a system 400 is shown. System 400 may include display control unit 402, communication fabric 405, bus mux 410, switch 415, memory controller 420, and memory 435. System 400 may also include other components (e.g., processor, I/O devices) which are not shown to avoid obscuring the figure. Display control unit 402 may be configured to generate requests for source pixel data, and display control unit 402 may convey the requests to communication fabric 405. Display control unit 402 may also be configured to generate and convey wake-up signals to one or more components of system 400.

In one embodiment, display control unit 402 may be configured to generate a sideband wake-up signal to memory 435. This is shown as a solid line in FIG. 4. In other embodiments, display control unit 402 may be configured to generate sideband wake-up signals to the other components of system 400. These are shown as dashed lines in FIG. 4. Alternatively, display control unit 402 may send a request to communication fabric 405, with the request serving as a wake-up signal to communication fabric 405 if communication fabric 405 is asleep. The request may then wake-up the other components in a serial manner as the request traverses the path to memory 435.

Display control unit 402 may be configured to schedule the timing of the issuing of requests and the generation of sideband wake-up signals so as to minimize latency and maximize power reduction. It may be assumed for the purposes of this discussion that one or more components of system 400 are powered down while display control unit 402 waits to issue requests. Display control unit 402 may determine that the stored pixel data has reached or is approaching a point when new requests need to be issued to prevent an underrun from occurring which could cause visual artifacts on the display (not shown).

Display control unit 402 may determine when to issue requests and when to send sideband wake-up signals based on one or more thresholds and based on various configuration data. The one or more thresholds may correspond to buffer occupancy levels of one or more buffers (e.g., pixel buffer, line buffers) in display control unit 402. In one embodiment, the display control unit 402 may choose different sets of thresholds to use based on the status of a cache hint. If the cache hint is set to "allocate", this indicates the data is likely in memory cache 430, and so display control unit 402 may prevent a sideband wake-up signal from being sent to memory 435 in this case. If the requested data is in memory cache 430 as anticipated based on the cache hint being set to "allocate", then memory 435 will not be woken up. Therefore, memory 435 will remain power-gated and power will be saved.

When the cache hint is set to "allocate", the request may be sent to communication fabric 405, bus mux 410, switch 415, and cache control unit 425, and then the data targeted by the request may be retrieved from memory cache 430 if the data is in fact stored in the cache 430. If the cache hint is set to "do not allocate", then display control unit 402 may send a sideband wake-up signal to memory 435 prior to issuing a request to communication fabric 405. This allows communication fabric 405 to stay power-gated for a longer period of time which will result in increased power savings. The amount of time it takes to wake up memory 435 may be long in some cases, and so it is more efficient to send the sideband wakeup signal early to memory 435 while communication fabric 405 is still power-gated. Accordingly, communication fabric 405 may remain in the power-gated state subsequent to the wake-up signal being sent to memory 435. Both the timing of the sideband wake-up signal and the issuing of the request may be based on corresponding buffer occupancy thresholds specified for the case when the cache hint is set to "do not allocate". The buffer occupancy threshold for the wake-up signal may be programmed based on the amount of time it takes to wake up memory 435 and the amount of time it takes for the request to reach memory 435 by traversing each of the components on the path to memory 435. The buffer occupancy threshold for the wake-up signal may also be based on the rate at which pixels are being consumed out of the one or more buffer(s). Generally speaking, the buffer occupancy threshold for waking up memory 435 will be high and the buffer occupancy threshold for issuing a request threshold will be low. In other words, a sideband signal may be sent to memory 435 early to wake-up memory 435 and a request may be sent to the fabric late to allow enough time for the memory 435 to wake-up by the time the request arrives at memory 435 after traversing the other components on the path to memory.

Figure 5:
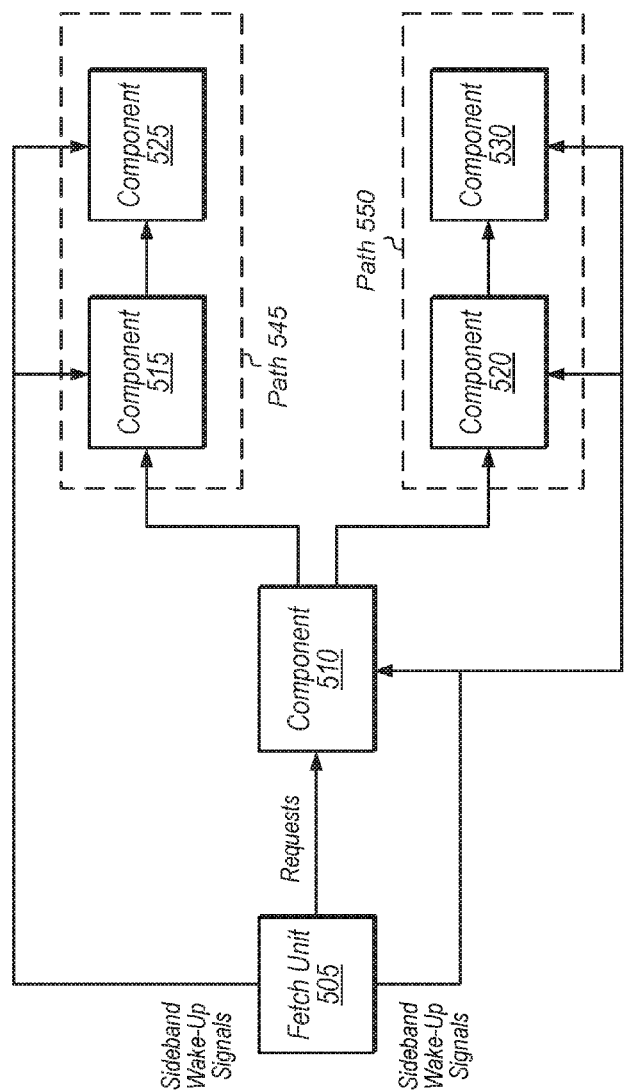
FIG. 5 is a block diagram illustrating another embodiment of system.

Referring now to FIG. 5, a block diagram of one embodiment of a system 500 for conveying requests and sideband wakeup signals is shown. Fetch unit 505 is representative of a fetch unit which may be part of another component or unit. For example, in one embodiment, fetch unit 505 may be incorporated within a display control unit. In other embodiments, fetch unit 505 may be part of other types of components or logical units. Fetch unit 505 may be coupled to component 510, and component 510 may be coupled to component 515 and component 520. Component 515 may be coupled to component 525, with component 515 and component 525 corresponding to path 545. Component 520 may be coupled to component 530, with component 520 and component 530 corresponding to path 550.

Each of components 510-530 may be any type of component, depending on the embodiment. For example, components may include communication fabric, bus mux, switch, memory controller, cache, memory device, input/output (I/O) device, processor, programmable logic device (PLD), or other types of devices or logical units. Requests generated by fetch unit 505 may take either path 545 or path 550 to reach a destination. It should be understood that system 500 is merely one example of a system with multiple paths. In other embodiments, other systems may include more than two separate paths. Additionally, although path 545 and 550 are shown as having different destination components, in other embodiments, some paths may end at the same component.

Prior to fetch unit 505 generating a request, fetch unit 505 may attempt to predict which path a request will take through the components of system 500. Fetch unit 505 may utilize various configuration data to make the prediction. In one embodiment, the configuration data may include a cache hint. In other embodiments, the configuration data may include a directed indication, use-based data, addresses of requests, the power state of system 500, the power state of individual components of system 500, and/or other data.

Also, prior to fetch unit 505 generating a request, fetch unit 505 may determine which components are in a reduced power state. If one or more components are in a reduced power state and these one or more components are on the path the request is predicted to take, then fetch unit 505 may determine which component has the longest latency for returning to an operational state. Fetch unit 505 may then send a sideband wake-up signal to the component with the longest latency. In some cases, fetch unit 505 may send the sideband wake-up signal prior to issuing the request to component 510. Also, if component 510 is power-gated or in a reduced power state, and component 510 has a long latency for returning to an operational state, then fetch unit 505 may send a wake-up signal to component 510 prior to issuing the request to component 510.

Generally speaking, fetch unit 505 may determine when to send sideband wake-up signals to each of the one or more components and when to issue a request so as to coordinate the wake-up of each component such that the component wakes up as near as possible to when a request will arrive at the component. In various embodiments, wake signals and requests may be generated in a manner such that components in a communication path may wake at approximately the same time. Although the sideband wake-up signals are shown as sharing a connection for portions of the path, it should be noted that this is shown merely for ease of illustration. It should be understood that each sideband wake-up signal may take a completely separate path to each individual component rather than be routed along a shared wire or bus for portions of the path.

In one embodiment, fetch unit 505 may monitor the status of one or more buffers and fetch unit 505 may utilize thresholds based on buffer occupancy to determine when to generate sideband wake-up signals and when to issue requests when one or more components of system 500 are in a reduced power state. In another embodiment, fetch unit 505 may access a table with information on the latencies of the different components for determining when to generate sideband wake-up signals and when to issue requests.

If fetch unit 505 is able to determine which path a request will take through the system 500, then fetch unit 505 may schedule wake-up of the individual components such that the longest latency components are awakened first and the lower latency components are awakened later. If fetch unit 505 is unable to determine which path a request will take, then the display control unit may issue a request earlier. In one embodiment, fetch unit 505 may wake-up a subset of components of system 500 and the fetch unit 505 may leave other components in a sleep or low-power state.

If other components are sending requests along the same path as fetch unit 505, then this may increase latency, which means events may need to start earlier than usual. Fetch unit 505 may monitor or otherwise receive signals indicating if other components are sending requests along the same path as the predicted path for a given request generated by fetch unit 505. Fetch unit 505 may utilize this information for determining when to send sideband wake-up signals and when to issue requests.

Figure 6:
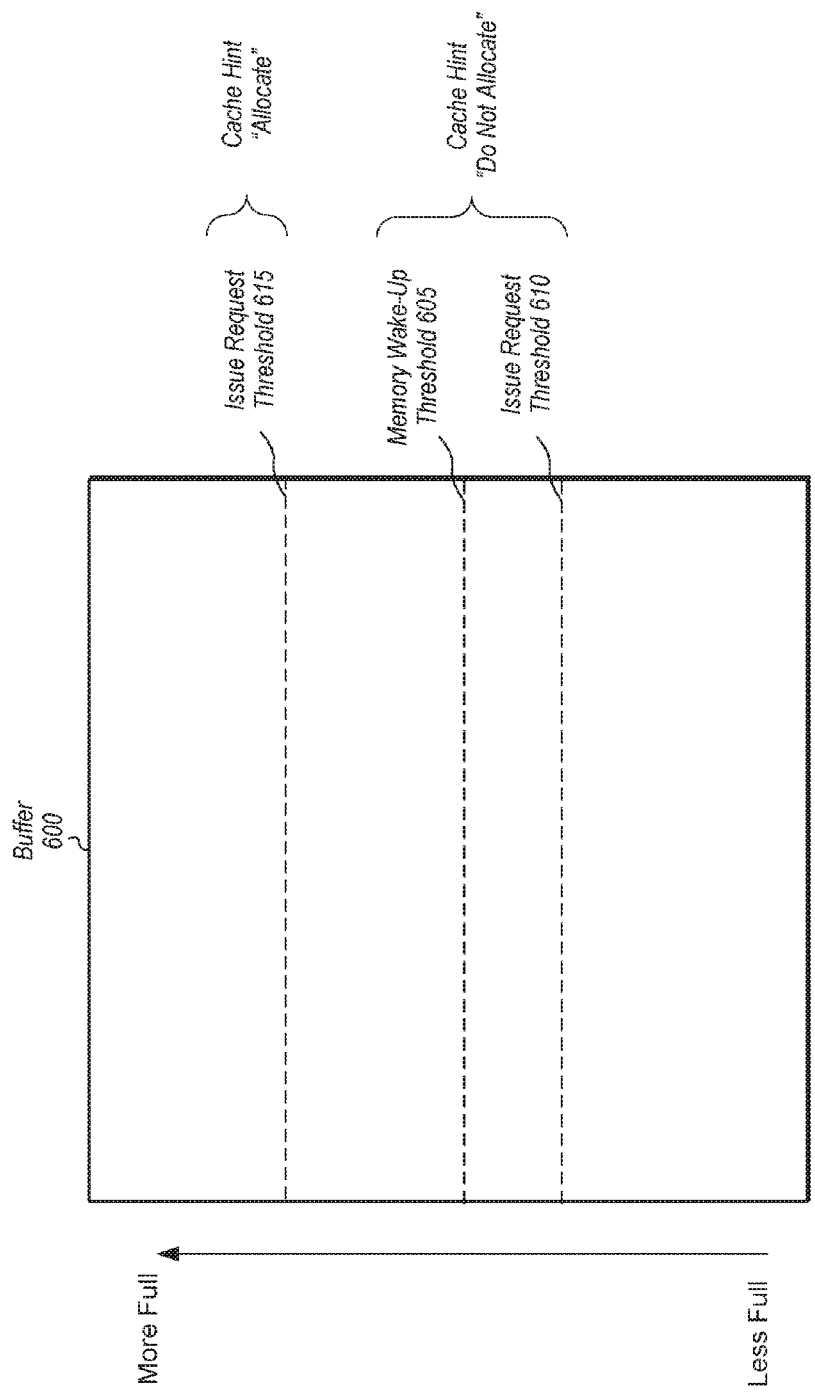
FIG. 6 illustrates one embodiment of a buffer and thresholds.
Figure 7:
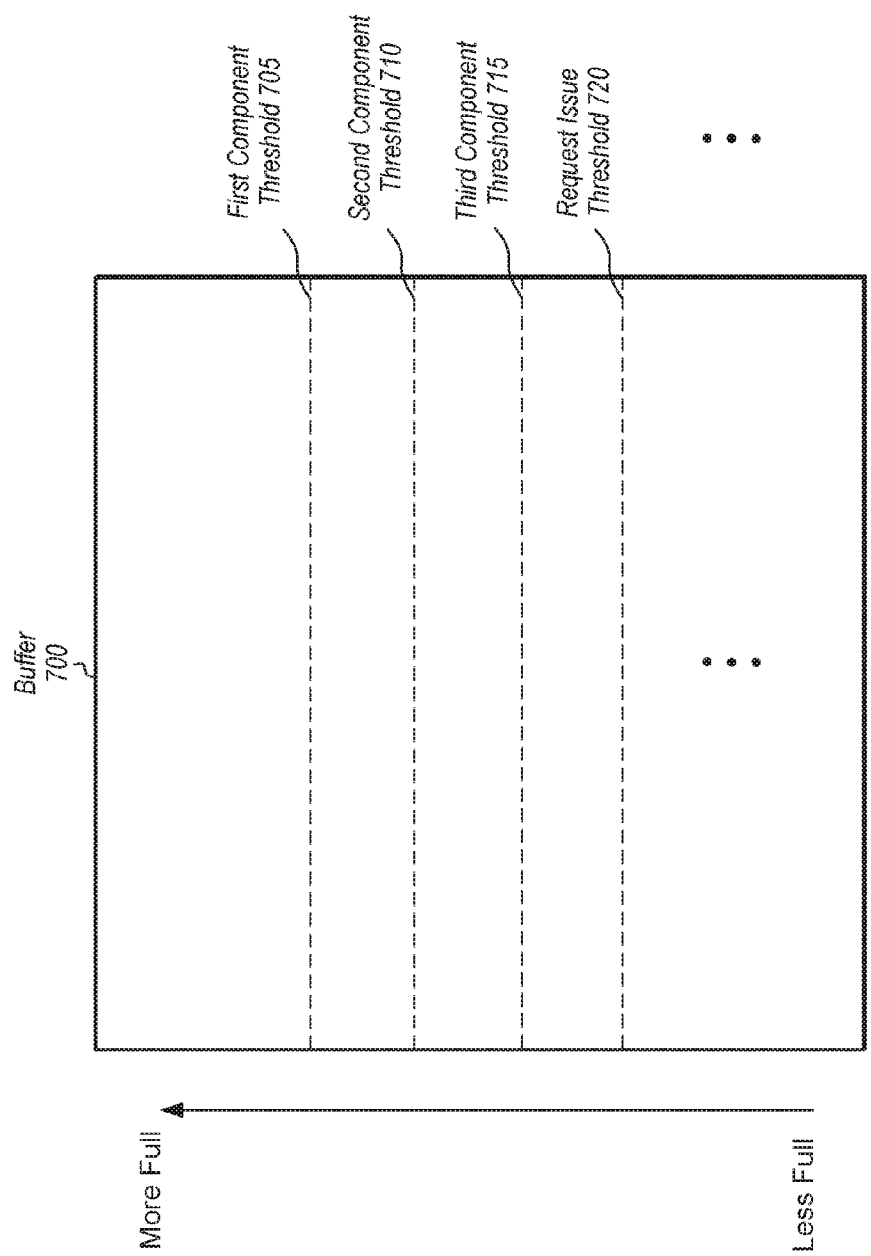
FIG. 7 illustrates another embodiment of a buffer and thresholds.

Turning now to FIG. 6, one embodiment of a buffer and thresholds are shown. Buffer 600 is representative of a pixel buffer and/or line buffer(s) within a display control unit (e.g., display control unit 200 of FIG. 2). In the example shown, the buffer is shown to fill from the bottom (less full) to the top (more full). FIG. 7 provides a similar indication. However, this could be reversed and in fact the indications may be logical only. For example, the storage space associated with the buffer 600 may not be contiguous. Rather, the buffer 600 may include N entries with a count maintained to indicate how many of the entries are occupied. Such a count could then be compared to other counts (thresholds). Numerous such embodiments are possible and are contemplated. In one embodiment, a display control unit may monitor the occupancy of a pixel buffer. In another embodiment, the display control unit may monitor the occupancy of one or more line buffers. In a further embodiment, the display control unit may monitor the total combined occupancy of a pixel buffer and one or more line buffers. The thresholds shown within buffer 600 are intended to represent various triggers that may be utilized for initiating corresponding events based on the occupancy of the buffer(s) being monitored.

In one embodiment, programmable thresholds of the buffer occupancy may be used to determine when to issue requests and when to generate wake-up signals for the various components of a host apparatus or system. In another embodiment, a table may be utilized to store timing values associated with the components for determining when to issue requests and when to send wake-up signals to the components. For example, the table may include an entry for each component with the amount of time needed to wake-up the component and the amount of time it will take for a request to reach the component. The display control unit may utilize the table to determine when to generate wake-up signals for a plurality of components and when to issue a request to maximize power savings while minimizing latency. In another embodiment, the table may include multiple entries for each component, with a first entry corresponding to a first component in a first scenario (e.g., for a first path and first configuration data), with a second entry corresponding to the first component in a second scenario (e.g., for a second path and second configuration data), and so on.

In one embodiment, the thresholds shown within buffer 600 may be utilized for waking up components coupled to the display control unit for processing a request generated by the display control unit. It may be assumed for the purposes of the discussion associated with FIG. 6 that multiple components have been power-gated so as to reduce power consumption. The components that are power-gated may include a communication fabric, memory cache, and/or memory device. Other components may also be power-gated in other scenarios.

In one embodiment, the thresholds may be grouped into different sets based on configuration data (e.g., cache hint) which may be checked by a display control unit prior to issuing a request. In the embodiment illustrated in FIG. 6, the configuration data may be a cache hint for source pixel data. Thresholds 605 and 610 may be utilized when the cache hint is "do not allocate" and threshold 615 may be utilized when the cache hint is "allocate". In other embodiments, the configuration data may include other information.

Threshold 605 is representative of a memory wake-up threshold and threshold 610 is representative of an issue request threshold for the case when the cache hint is "do not allocate". In this case, when the buffer occupancy falls below threshold 605, a sideband signal may be sent to wake up the memory device. Then, as the buffer occupancy continues to fall and the buffer occupancy reaches the threshold 610, the display control unit may issue a pixel fetch request. The pixel fetch request may be issued and sent to the communication fabric, which may itself serve to wake the communication fabric. In other embodiments, a separate wake signal could be sent to the communication fabric before issuing the request. Then, the pixel fetch request may pass from the communication fabric to the memory controller and on to the memory device. The issue request threshold 610 may be programmed such that when the request is issued, the request will reach the memory device at approximately the same time that the memory device wakes up from the previously sent wake-up signal.

For the case when the cache hint is set to "allocate", the display control unit may utilize issue request threshold 615 for determining when to issue a request to memory. In this case, the display control unit may issue the request earlier than in the case when the cache hint is set to "do not allocate". Such an approach may be used in order to account for the increased latency that might result from accessing the caches, but then determining the data is not in the cache. In such a case, an access of the memory would then be needed. In various embodiments, the display control unit may not send a wake-up signal to the memory device in the case when the cache hint is set to "allocate" since the data is not expected to be in memory. If an access of the cache ultimately misses, and an access of memory is required, the routing of the request to the memory controller may itself serve to wake the memory device (e.g., memory controller). Accordingly, when the buffer occupancy falls below the issue request threshold 615, the display control unit may be configured to issue a request to the communication fabric. The request itself may cause the communication fabric to wake up, and then the other components may also wake-up in a serial fashion up to and including the memory cache (if the data is cached) or the memory device (if the data is not cached).

Referring now to FIG. 7, another embodiment of a buffer and a plurality of thresholds are shown. Buffer 700 is representative of a pixel buffer and/or line buffer(s) within a display control unit (e.g., display control unit 200 of FIG. 2). The display control unit may monitor the occupancy of buffer 700 and determine when to perform various events based on the occupancy of buffer 700 reaching thresholds 705-720. Thresholds 705-720 are representative of any number of programmable thresholds which may be utilized in combination with buffer 700.

Threshold 705 is representative of a threshold associated with a first component (e.g., processor, fabric, memory device, memory controller) of a plurality of components of a host apparatus or system. In one embodiment, the first component may be the component with the longest latency for coming out of a reduced power state into an operational state. Accordingly, threshold 705 may be the highest threshold in buffer 700, with threshold 705 triggering a sideband signal to wake-up the first component when the occupancy of buffer 700 falls below threshold 705.

Threshold 710 is representative of a threshold associated with a second component of the plurality of components of the host apparatus or system. Alternatively, threshold 710 may correspond to the first component in a second power state, with threshold 705 representing the first component in a first power state. For example, the first component may be placed in a plurality of power states with different voltage and frequency settings, and the time it takes for the first component to return to a fully operational state from the first power state may be longer than the time it takes for the first component to return to a fully operational state from the second power state.

Similarly, threshold 715 is representative of a threshold associated with a third component. Alternatively, threshold 715 may correspond to another component in a different power state. Threshold 720 is representative of a threshold which may be used to trigger the issuing of a request. For example, when the occupancy of buffer 700 falls below threshold 720, the display control unit may be configured to issue a request. Threshold 720 may be programmed such that when a request is issued in response to the occupancy of buffer 700 falling below threshold 720, the request will ripple through the plurality of components with timing that matches the components waking up out of their reduced power states.

It is noted that the locations and ordering of thresholds 705-720 in buffer 700 is merely indicative of one embodiment. In other embodiments, the thresholds may be arranged in a different order than that shown. For example, request issue threshold 720 may be higher than one or more of the component thresholds in other embodiments. Additionally, the second component threshold 710 may be the highest, followed by either the first component threshold 705 or the third component threshold 715. Any of a variety of such orderings are possible and are contemplated.

Figure 8:
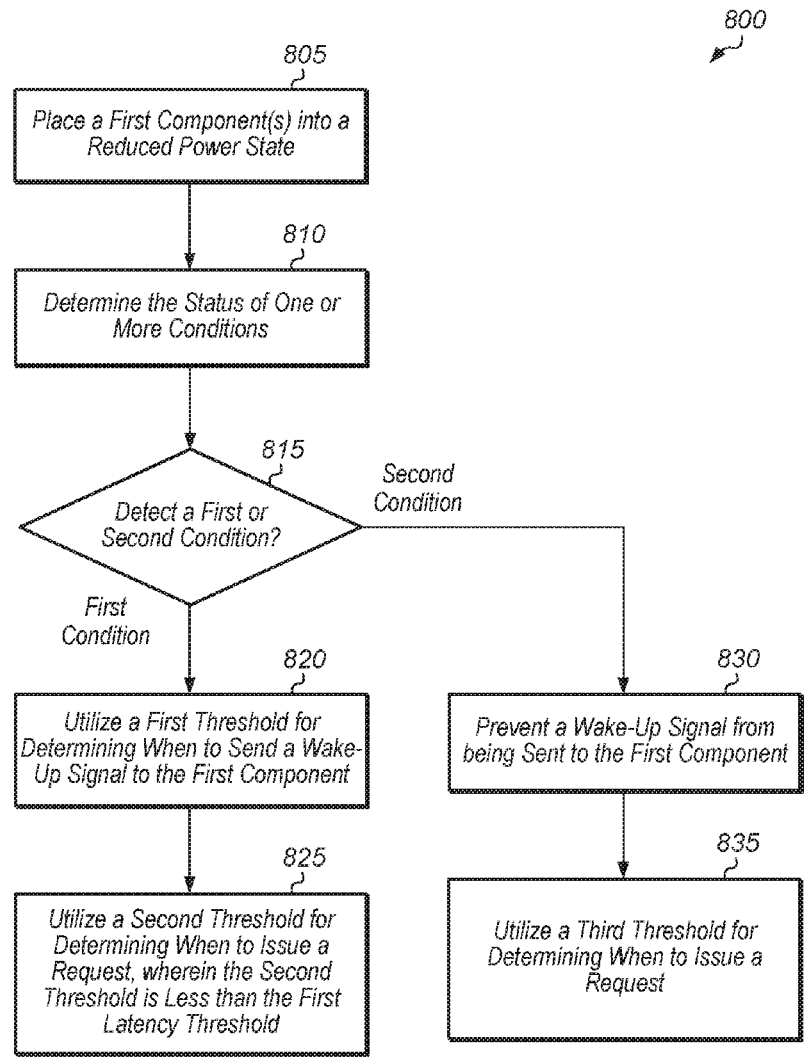
FIG. 8 is a generalized flow diagram illustrating one embodiment of a method for implementing improved power management techniques.

Turning now to FIG. 8, one embodiment of a method 800 for implementing improved power management techniques is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 800.

A first component (or group of components) may be placed into a reduced power state (block 805). In one embodiment, the first component may be a memory device configured to store source pixel data which will be processed by a display control unit. The display control unit may be configured to read data from one or more frame buffers and provide a stream of pixel values for display. In one embodiment, the display control unit may be coupled to a communication fabric, the communication fabric may be coupled to a memory controller, and the memory controller may be coupled to the memory device. Pixel fetch requests generated by the display control unit may traverse the communication fabric and memory controller on the path to the memory device. The memory controller may include a memory cache for caching data retrieved from the memory device. In some embodiments, the communication fabric, memory controller, and memory cache may also be in a reduced power state. In other embodiments, the first component may be any of various other types of components.

In response to determining that the first component is in a reduced power state, the display control unit may determine the status of one or more conditions (block 810). If a first condition is detected (conditional block 815, "first condition" leg), then the display control unit may utilize a first threshold for determining when to send a wake-up signal to the first component (block 820). In one embodiment, the first condition may be a cache hint indicating "do not allocate". In one embodiment, the first threshold may correspond to a buffer occupancy threshold of one or more buffers in the display control unit. The one or more buffers may include a pixel buffer and/or one or more line buffers. After block 820, the display control unit may utilize a second threshold for determining when to issue a request, wherein the second threshold is less than the first threshold (block 825). In other words, the first threshold will be reached at a first point in time and the second threshold will be reached at a second point in time, wherein the second point in time is subsequent to the first point in time. In one embodiment, the issued request may be sent to a communication fabric, and the issued request may wake-up the communication fabric.

If a second condition is detected (conditional block 815, "second condition" leg), then the display control unit may prevent a wake-up signal from being sent to the first component (block 830). In one embodiment, the second condition may be the cache hint being set to "allocate". Next, the display control unit may utilize a third threshold for determining when to issue a request, wherein the third threshold may be greater than or less than the second threshold (block 835) depending on the embodiment. In one embodiment, the request issued in block 835 may cause a wake-up of each component in a serial manner for the plurality of components on the path traversed by the request. For example, a second component may be woken up when the second component receives the request, followed by a third component waking up when the third component receives the request, and so on. In one embodiment, the second and third thresholds may correspond to buffer occupancy thresholds of one or more buffers in the display control unit. After blocks 825 and 835, method 800 may end.

In some cases, even when the display control unit has determined that the cache hint is set to allocate and the data targeted by the request is probably in the memory cache, the data may actually be in memory, and the request may end up receiving the targeted data from memory. In these cases, the memory will be woken up when the request reaches the memory.

Figure 9:
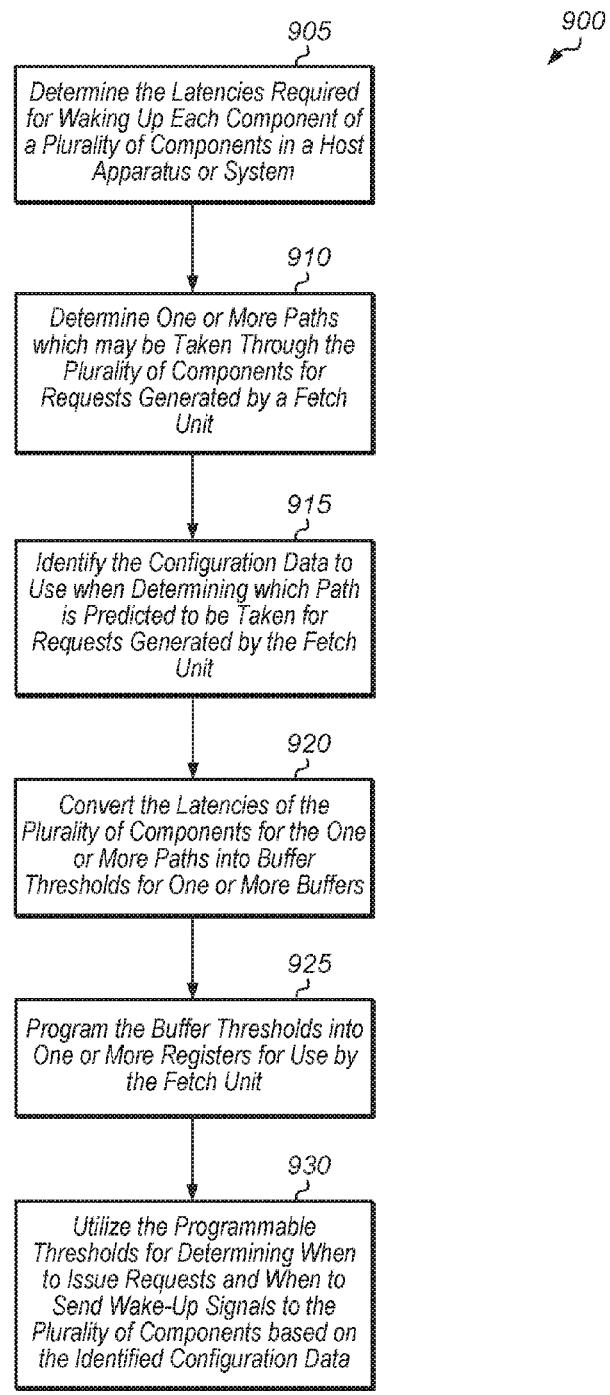
FIG. 9 is a generalized flow diagram illustrating one embodiment of a method for generating wake-up signals and issuing requests.

Referring now to FIG. 9, one embodiment of a method 900 for generating wake-up signals and issuing requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 900. Generally speaking, the method depicted in FIG. 9 may seek to have multiple components in a system wake at approximately the same time (or at least closer in time to one another than might otherwise be the case).

A control unit may be configured to determine the latencies required for waking up each of a plurality of components in a host apparatus or system (block 905). The control unit may be implemented using any combination of software and/or hardware. Next, the control unit may be configured to determine one or more paths which may be taken through the plurality of components for requests generated by a fetch unit (block 910). In one embodiment, the fetch unit may be part of a display control unit within the host apparatus or system. The display control unit may be coupled to a memory (via a communication fabric), and the display control unit may be coupled to a display (via a display interface). Depending on the embodiment, the host apparatus or system may be a mobile device (e.g., tablet, smartphone), wearable device, computer, or other computing device or system. The control unit may then identify the configuration data to use when determining which path is predicted to be taken for requests generated by the fetch unit (block 915). In one embodiment, the configuration data may include a cache hint.

Next, the control unit may convert the latencies of the plurality of components for the one or more paths into buffer thresholds for one or more buffers (block 920). In one embodiment, the values of the buffer thresholds may be calculated by converting an amount of time it takes for each component to wake up into an amount of data that will be consumed out of the buffer during the amount of time. In one embodiment, the one or more buffers may include the pixel buffer and/or line buffers of a display control unit. Then, the control unit may program the buffer thresholds into one or more registers for use by the fetch unit (block 925). Next, the fetch unit may utilize the programmable thresholds for determining when to issue requests and when to send wake-up signals to the plurality of components based on the identified configuration data (block 930). After block 930, method 900 may end.

Figure 10:
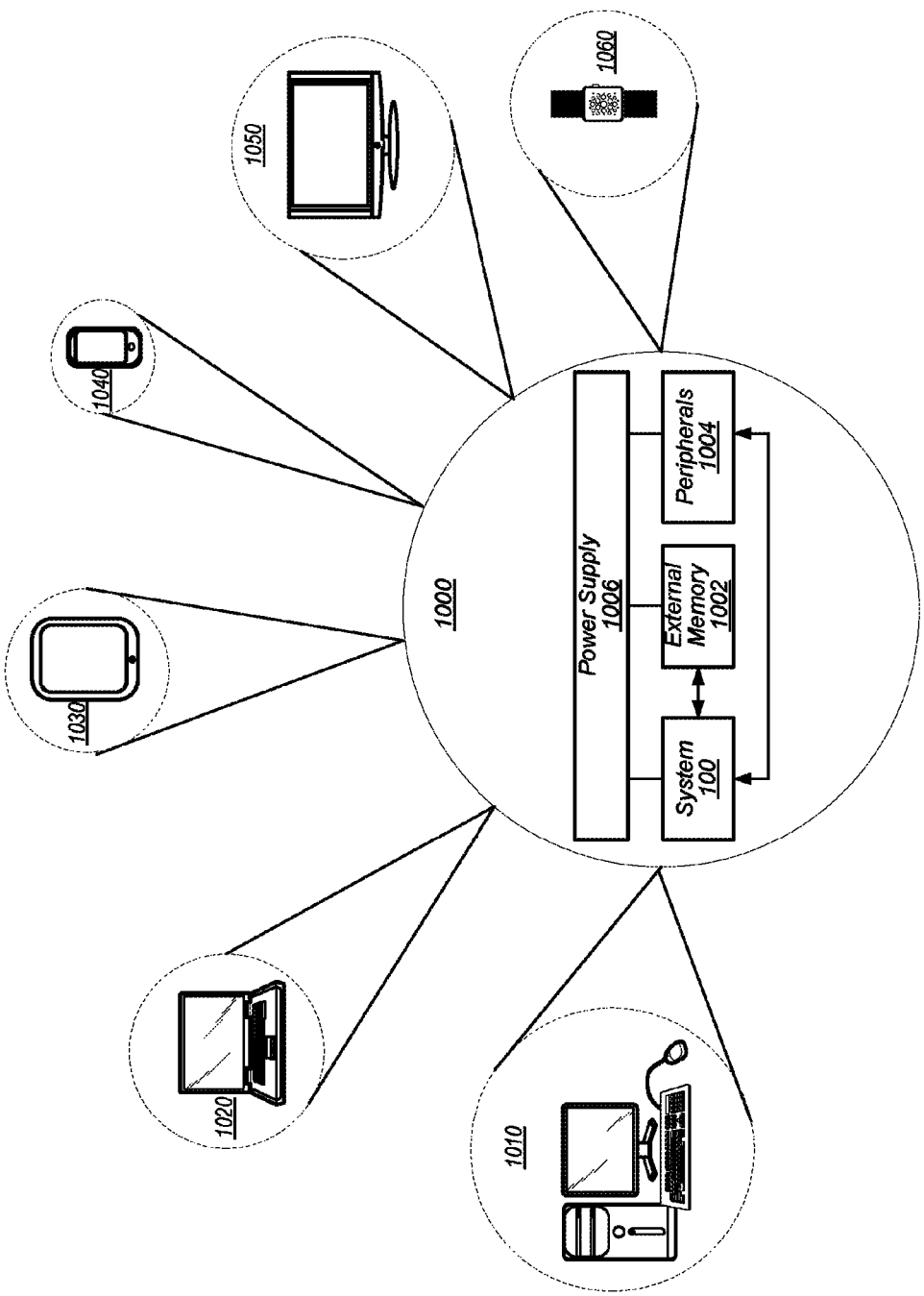
FIG. 10 is a block diagram of one embodiment of a system.

Turning next to FIG. 10, a block diagram of one embodiment of a system 1000 is shown. As shown, system 1000 may represent chip, circuitry, components, etc., of a desktop computer 1010, laptop computer 1020, tablet computer 1030, cell phone 1040, television 1050 (or set top box configured to be coupled to a television), wrist watch or other wearable item 1060, or otherwise. Other devices are possible and are contemplated. In the illustrated embodiment, the system 1000 includes at least one instance of system 100 (of FIG. 1) coupled to an external memory 1002.

System 100 is coupled to one or more peripherals 1004 and the external memory 1002. A power supply 1006 is also provided which supplies the supply voltages to system 100 as well as one or more supply voltages to the memory 1002 and/or the peripherals 1004. In various embodiments, power supply 1006 may represent a battery (e.g., a rechargeable battery in a smart phone, laptop or tablet computer). In some embodiments, more than one instance of system 100 may be included (and more than one external memory 1002 may be included as well).

The memory 1002 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with system 100 in a chip-on-chip configuration, a package-on-package configuration, or a multi-chip module configuration.

The peripherals 1004 may include any desired circuitry, depending on the type of system 1000. For example, in one embodiment, peripherals 1004 may include devices for various types of wireless communication, such as wifi, Bluetooth, cellular, global positioning system, etc. The peripherals 1004 may also include additional storage, including RAM storage, solid state storage, or disk storage. The peripherals 1004 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A display control unit comprising:
   an interface configured to convey requests to a first component via a second component, wherein a wake-up latency of the first component is greater than a wake-up latency of the second component;
   a buffer; and
   control logic;
   wherein responsive to detecting a first condition, and both the first component and the second component are in a low power state, the control logic is configured to:
   send a first wake-up signal to the first component using a first buffer threshold to determine when to send the first wake-up signal, wherein the first wake-up signal comprises a sideband signal that bypasses the second component while leaving the second component in the lower power state; and
   send a second wake-up signal to the second component subsequent to the first wake-up signal using a second buffer threshold to determine when to send the second wake-up signal, wherein the second buffer threshold is less than the first buffer threshold.

2. The display control unit as recited in claim 1, wherein responsive to detecting a second condition, the control logic is configured to use a third buffer threshold to determine when to send the second wake-up signal, wherein the third buffer threshold is different from the second buffer threshold.

3. The display control unit as recited in claim 1, wherein the first component is a memory, the first condition is an indication that requested data is not cached, and the second condition is an indication that the requested data may be cached.

4. The display control unit as recited in claim 1, wherein the second component is required to be awake in order to perform an access to the first component.

5. The display control unit as recited in claim 1, wherein the first component is a memory, and the second component is a communication fabric.

6. The display control unit as recited in claim 5, wherein the communication fabric remains in a reduced power state subsequent to sending the first wake-up signal to the memory.

7. A computing system comprising:
   a first component;
   a second component, wherein a wake-up latency of the first component is greater than a wake-up latency of the second component; and
   a display control unit;
   wherein responsive to detecting a first condition, and both the first component and the second component are in a low power state, the display control unit is configured to:
   send a first wake-up signal to the first component using a first buffer threshold to determine when to send the first wake-up signal, wherein the first wake-up signal comprises a sideband signal that bypasses the second component; and send a second wake-up signal to the second component subsequent to the first wake-up signal using a second buffer threshold to determine when to send the second wake-up signal, wherein the second buffer threshold is less than the first buffer threshold.

8. The computing system as recited in claim 7, wherein responsive to detecting a second condition, the display control unit is configured to use a third buffer threshold to determine when to send the second wake-up signal, wherein the third buffer threshold is different from the second buffer threshold.

9. The computing system as recited in claim 7, wherein the first component is a memory, the first condition is an indication that requested data is not cached, and the second condition is an indication that the requested data may be cached.

10. The computing system as recited in claim 9, wherein the second component is required to be awake in order to perform an access to the first component.

11. The computing system as recited in claim 7, wherein the first component is a memory, and the second component is a communication fabric.

12. The computing system as recited in claim 11, wherein the communication fabric remains in a reduced power state subsequent to sending the first wake-up signal to the memory.

13. A method comprising:
sending requests to a first component via a second component;
detecting a first condition;
responsive to detecting the first condition and detecting both the first component and the second component are in a low power state:
sending a first wake-up signal to the first component using a first buffer threshold to determine when to send the first wake-up signal, wherein the first wake-up signal comprises a sideband signal that bypasses the second component; and
sending a second wake-up signal to the second component subsequent to the first wake-up signal using a second buffer threshold to determine when to send the second wake-up signal, wherein the second buffer threshold is less than the first buffer threshold.

14. The method as recited in claim 13, wherein responsive to detecting a second condition, the method further comprises using a third buffer threshold to determine when to send the second wake-up signal, wherein the third buffer threshold is different from the second buffer threshold.

15. The method as recited in claim 14, wherein the first component is a memory, the first condition is an indication that requested data is not cached, and the second condition is an indication that the requested data may be cached.

16. The method as recited in claim 15, wherein the second component is required to be awake in order to perform an access to the first component.

17. The method as recited in claim 13, wherein the first component is a memory, and the second component is a communication fabric.

18. The method as recited in claim 17, wherein the communication fabric remains in a reduced power state subsequent to sending the first wake-up signal to the memory.

* * * * *